Patented May 27, 1952

2,597,920

UNITED STATES PATENT OFFICE 2,597,920

ORGANO-TIN COMPOUNDS AND COMPOSITION INCLUDING SAME AND METHOD OF MAKING SAME

Richard T. Carroll, Akron, Ohio, assignor to The B. F. Goodrich Company, New York, N. Y., a corporation of New York No Drawing. Application June 29, 1951,
Serial No. 234,464

21 Claims. (Cl. 260—45.75)

This invention relates to organo-tin compounds and pertains more particularly to organo-tin heat and light stabilizers for synthetic resin compositions containing a polymer of monomeric material including a chloroethylene having 1 to 2 chlorine atoms attached to one only of the carbon atoms and the method of making same.

It is an object of this invention to provide organo-tin compounds which are compatible with synthetic resin compositions containing a polymer of vinyl or vinylidene chloride and which are capable of stabilizing vinyl or vinylidene chloride polymer compositions against the effects of heat and/or light.

It is also an object of this invention to provide clear vinyl and vinylidene chloride polymer compositions which exhibit a high degree of stability when exposed to heat and/or light.

Another object of this invention is to provide a convenient and economical method of stabilizing vinyl and vinylidene chloride polymer compositions against the influence of heat and/or light.

Other objects of this invention will be apparent from the description which follows.

Compositions including a polymer containing a chloroethylene having 1 to 2 chlorine atoms attached to one only of the carbon atoms, such as vinyl chloride and vinylidene chloride polymers, although substantially clear immediately after their preparation, tend to deteriorate when subjected to the influence of light and/or heat with an accompanying darkening of the compositions rendering them unsatisfactory for many purposes where light and/or heat stability are important considerations. To retard or eliminate the effects of light and heat on the aforementioned compositions various inhibitors have been incorporated into the compositions as stabilizing ingredients. Heretofore known stabilizers for vinyl and vinylidene chloride polymers have not been entirely satisfactory, however, in that they frequently do not sufficiently protect the polymers against the influences of heat and light and often are difficult and expensive to manufacture.

I have now discovered a class of stabilizers which attains the objectives enumerated above and which are not susceptible to deficiencies of heretofore known heat and light stabilizers for vinyl and vinylidene chloride polymers and the like. An organo-tin stabilizer within the purview of this invention not only stabilizes vinyl and vinylidene chloride polymers and the like against the deteriorating effects of heat and light but also is compatible with the polymers when incorporated therewith providing compositions which may be clear and transparent. Organo-tin compounds included in this invention may be prepared by reacting an organo-tin oxide with an ester of an oxygen-containing acid having at least one oxygen atom in an acid radical attached to a replaceable acid hydrogen atom.

Organo-tin oxides within the purview of this invention may be represented by the following empirical formula:

where $R_1$ and $R_2$ or monovalent hydrocarbon groups, preferably aryl or alkyl groups. Among the organo-tin oxides included in this invention are:

Dimethyl tin oxide
Diethyl tin oxide
Dipropyl tin oxide
Dibutyl tin oxide
Diamyl tin oxide
Dioctyl tin oxide
Didecyl tin oxide Dilauryl tin oxide
Dipropenyl tin oxide
Diphenyl tin oxide
Dinaphthyl tin oxide
Ditolyl tin oxide
Methyl ethyl tin oxide
Phenyl butyl tin oxide and the like.

In this invention the term oxygen-containing acid having at least one oxygen atom in an acid radical attached to a replaceable acid hydrogen atom is used to define organic acids commonly referred to as carboxylic acids and inorganic acids containing at least one oxygen atom in the acid radical attached to a replaceable acid hydrogen atom such as phosphorous acid, phosphoric acid, silicic acid, sulfurous acid, sulfuric acid, arsenous acid, arsenic acid, boric acid, perchloric acid, chlorous acid, periodic acid, iodous acid, iodic acid, chromous acid, chromic acid, hypochloric acid, nitrous acid, nitric acid, selenic acid, selenious acid, tellurous acid, telluric acid, titanic acid, bromous acid, bromic acid, and the like.

Among the esters of an oxygen-containing acid having at least one oxygen atom in an acid radical attached to a replaceable acid hydrogen atom useful in this invention are hydrocarbon esters of these acids, such as:

| | |
|---|---|
| Ethyl ortho silicate | Diethyl m-phthalate |
| Triethyl arsenate | Diethyl p-phthalate |
| n-Propyl nitrate | Butyl butyrate |
| Di-n-propyl sulfate | Dibutyl sebacate |
| Tributyl phosphate | Dioctyl phthalate |
| n-Octyl nitrate | Butyl glycol phthalate |
| Di-n-dodecyl sulfate | n-Butyl propionate |
| Tri-o-cresyl phosphate | Ethylene butyrate |
| Tri-p-cresyl phosphate | Ethylene laurate |
| Amyl borate | 2-propenyl butanoate |
| Methyl acetate | Phenol acetate |
| Dimethyl maleate | Phenyl laurate |
| Dimethyl phthalate | Diphenyl phthalate |
| Ethyl benzoate | Phenyl salicylate |
| Diethyl maleate | B-naphthyl benzoate |
| Diethyl phthalate | 2-naphthyl lactate | and the like.

A preferred group of esters for use in this invention are the aliphatic hydrocarbon esters of an oxygen-containing acid having at least one oxygen atom in an acid radical attached to a replaceable acid hydrogen atom, such as:

| | |
|---|---|
| Ethyl ortho silicate | Diethyl maleate |
| Triethyl arsenate | Diethyl phthalate |
| n-Propyl nitrate | Diethyl m-phthalate |
| Di-n-propyl sulfate | Diethyl p-phthalate |
| Tributyl phosphate | Butyl butyrate |
| Di-n-dodecyl sulfate | Dibutyl sebacate |
| Amyl borate | Dioctyl phthalate |
| Methyl acetate | n-Butyl propionate |
| Dimethyl maleate | Ethylene butyrate |
| Dimethyl phthalate | Ethylene laurate |
| Ethyl benzoate | 2-propenyl butanoate | and the like.

Better results are obtained, however, if the ester for use in this invention is a saturated-aliphatic hydrocarbon ester of an acid within the purview of this invention, such as:

| | |
|---|---|
| Ethyl ortho silicate | Ethyl benzoate |
| Triethyl arsenate | Diethyl maleate |
| n-Propyl nitrate | Diethyl phthalate |
| Di-n-propyl sulfate | Diethyl m-phthalate |
| Tributyl phosphate | Diethyl p-phthalate |
| Di-n-dodecyl sulfate | Butyl butyrate |
| Methyl acetate | Dibutyl sebacate |
| Dimethyl maleate | Dioctyl phthalate |
| Dimethyl phthalate | n-Butyl propionate | and the like.

Even more satisfactory results are obtained with hydrocarbon esters of carboxylic acids, such as:

| | |
|---|---|
| Methyl acetate | Diethyl maleate |
| Ethyl acetate | Ethyl benzoate |
| n-Propyl acetate | Amyl benzoate |
| Isopropyl acetate | B-naphthyl benzoate |
| Butyl acetate | Dimethyl phthalate |
| Phenol acetate | Diethyl phthalate |
| m-Cresyl acetate | Diethyl m-phthalate |
| Methyl propionate | Diethyl p-phthalate |
| n-butyl propionate | Butyl glycol phthalate |
| Sec-butyl propionate | Diphenyl phthalate |
| Ethylene propionate | Dibutyl sebacate |
| Ethyl butyrate | Ethylene stearate |
| n-Propyl butyrate | Ethylene laurate |
| Ethylene butyrate | Phenyl laurate |
| 2-propenyl butanoate | Phenyl salicylate |
| Pentyl butanoate | 2-naphthyl lactate |
| Dimethyl maleate | | and the like.

As a more preferred group, it is preferable that the ester be a hydrocarbon ester of maleic acid, such as:

| | |
|---|---|
| Dimethyl maleate | Dioctyl maleate |
| Diethyl maleate | Diphenyl maleate |
| Dipropyl maleate | Diethylene maleate | and the like.

Even more preferred are aliphatic hydrocarbon esters of maleic acid in which the aliphatic hydrocarbon group or groups have from one to twelve carbon atoms in the aliphatic radical, such as:

| | |
|---|---|
| Dimethyl maleate | Dibutyl maleate |
| Monoethyl maleate | Dioctyl maleate |
| Diethyl maleate | Diethylene maleate |
| Dipropyl maleate | Dipropenyl maleate | and the like.

For best results, it is preferable that the ester be a saturated-aliphatic hydrocarbon ester of maleic acid, such as:

| | |
|---|---|
| Dimethyl maleate | Dioctyl maleate |
| Diethyl maleate | Dilauryl maleate |
| Dibutyl maleate | | and the like.

Reaction products within the purview of the invention may be prepared by mixing the organo-tin oxide and the ester together in an agitator and heating the mixture while it is being continuously agitated, a reaction time of about one hour usually being sufficient. During the initial stage of heating, the mixture tends to solidify and form a stiff viscous mass which, as the reaction progresses, changes into a liquid state as the liquid reaction product is formed. When the reaction is complete, a substantially clear liquid product is obtained. Preferably the organo-tin oxide and ester are reacted in equimolar quantities, although a molar quantity of the ester may be reacted with several moles of the organo-tin oxide, for example, one mole of diethyl phthalate or ethyl ortho silicate have been reacted with one, two and four moles of an organo-tin oxide and one mole of tricresyl phosphate has been reacted with as many as six moles of an organo-tin oxide. The temperature at which the reaction occurs varies over a wide range depending upon the materials reacted and the quantity of each material used, a temperature from 100 to 225° C. usually being sufficient. For any particular mixture of an ester of an oxygen-containing acid as defined herein and an organo-tin oxide, a satisfactory temperature at which the reaction may be carried out is the temperature during the initial heating operation at which the mixture "sets up" to form a stiff viscous mass, although the reaction will proceed more rapidly at a temperature about 5° C. above this temperature. For example, when an equimolar mixture of diethyl phthalate and dibutyl tin oxide was agitated and heated to a temperature of 150° C., the slurry formed into a stiff viscous mass which, if maintained at this temperature, chemically reacted to form a clear light yellow reaction product, the reaction being completed after a reaction period of about one hour as evidenced by the viscous mass being completely transformed into the clear light yellow liquid product. The liquid reaction products of this invention are very soluble in volatile organic solvents, such as ether and acetone, indicating that the product is not merely a solution of the organo-tin oxide and the ester, since organo-tin oxides are highly insoluble in ether and acetone. After allowing the reaction product to stand for a long period of time no separation of the organo-tin oxide from the solution occurred which is further indication that the product is not merely a mixture of the organo-tin oxide and the ester. Analysis of the reaction product indicated that no alcohol or ether was formed during the reaction, although a small quantity of an unidentified volatile material was formed as the reaction proceeded. Accordingly, the product appears to be a new chemical compound.

The following examples of reaction products prepared in accordance with this invention are intended merely as illustrations of this invention and it will be understood that I do not intend to limit the scope of this invention to these examples.

Example 1

Equimolar quantities of dibutyl tin oxide and diethyl phthalate were mixed together in an agitator and the slurry was heated while continuously agitating the mixture for 60 minutes at a temperature of 150° C. at the end of which time the materials had completely reacted and a clear light yellow liquid product was obtained.

Example 2

Equimolar quantities of phenylbutyl tin oxide and dioctyl phthalate were mixed together in an agitator for 60 minutes at a temperature of 220° C. and a clear light yellow liquid product resulted at the completion of the reaction.

Example 3

Equimolar quantities of dibutyl tin oxide and diethyl maleate were agitated in an agitator for 70 minutes at 210° C. and a clear light yellow liquid product was obtained at the completion of the reaction.

Example 4

Dibutyl tin oxide and tricresyl phosphate were mixed together in an agitator in proportions of three molar quantities of dibutyl tin oxide for every molar quantity of tricresyl phosphate and the mixture while being agitated was heated for a period of 70 minutes at 220° C. whereupon a clear light yellow liquid product was obtained.

Example 5

Equimolar quantities of dibutyl tin oxide and ethyl ortho silicate were agitated together for 60 minutes at 170° C. and a clear light yellow liquid product was obtained.

Among the compositions which may be stabilized against the effects of heat and light with reaction products within the purview of this invention are compositions comprising homopolymers of a chloroethylene containing 1 to 2 chlorine atoms attached to one only of the carbon atoms, such as vinyl chloride and vinylidene chloride, copolymers of these chloroethylenes with each other or with other materials copolymerizable therewith, such as vinyl acetate, vinyl bromide, vinyl chloroacetate, vinyl propionate, vinyl butyrate, vinylidene bromide, vinylidene chlorofluoride, dimethyl maleate, dimethyl fumarate, dibutyl maleate, methyl acrylate, methyl methacrylate, methyl ethacrylate, 2-ethylhexyl acrylate, n-octyl acrylate, isononyl acrylate, decyl acrylate, diethyl chloromaleate, and the like, the chloroethylene being preferably present as the predominant material, or from polymers prepared from three or more polymerizable materials, such as the tripolymer of vinyl or vinylidene chloride, preferably being present in a predominant quantity, polymerized with a higher acrylate such as n-octyl acrylate and a third monomer such as acrylonitrile, styrene, vinyl acetate, vinyl benzoate, isobutylene or the like.

The reaction products of this invention are useful as light and heat stabilizers for either plasticized or unplasticized compositions, retarding deterioration of the compositions caused by exposure to sunlight and heat as evidenced by discoloration, hardening and cracking of the compositions. However, the reaction products are of particular value for stabilizing compositions comprising an appropriate plasticizer, of which many are well known to the art, such as tricresyl phosphate, dibutyl phthalate, dioctyl phthalate, etc. If a liquid plasticizer is used, it is desirable that from 20 to 600 parts by weight of plasticizer for every 100 parts by weight of polymer be used, although for best results it is preferable that from 20 to 80 parts by weight of plasticizer be incorporated with every 100 parts by weight of polymer. To obtain an optimum stabilized product, it is preferable that a reaction product within the purview of this invention in an amount from 0.1 to 5 percent by weight based on the weight of polymer be uniformly dispersed throughout the composition. Appropriate compounding ingredients, such as fillers, coloring pigments, etc., may also be employed in the polymer compositions.

To clearly illustrate this invention the following examples are cited; however it will be understood that they are intended merely for purposes of illustration and I do not intend to limit this invention to these illustrations.

Example 6

The following recipe is typical of a stabilized composition embodying this invention:

| Material: | Parts by weight |
|---|---|
| Polyvinyl chloride | 100.0 |
| Dioctyl phthalate | 50.0 |
| Equimolar dibutyl tin oxide-dioctyl phthalate reaction product | 3.0 |
| Total | 153.0 |

The ingredients were compounded together on a roll mill in the usual manner and a 6" x 1" x .07" sample was prepared by molding the compounded composition in a mold for 2 minutes at 345° F. The sample was exposed to an accelerated weathering test in a weatherometer which simulated actual weathering conditions by utilizing ultra violet light, moisture and heat. An unstabilized control sample failed after being exposed to the effects of the weatherometer for a period of about 100 hours as evidenced by its becoming a very dark brown color while the stabilized sample was still substantially clear and light-colored; it required about 380 hours for the stabilized sample to attain the same dark color as the control.

A 1" x 1" x .07" sample of the compounded composition was cut from the sheeted stock and was heated to a temperature of 175° C. in a circulating air oven. An unstabilized control sample become very dark brown in color after being heated at this temperature for a period of 1 hour while the stabilized sample remained substantially clear and light colored after the same exposure.

Example 7

Another typical example of a stabilized composition embodying this invention is as follows:

| Material: | Parts by weight |
|---|---|
| Polyvinyl chloride | 100.0 |
| Dioctyl phthalate | 50.0 |
| 3:1 dibutyl tin oxide-tricresyl phosphate reaction product | 1.5 |
| Total | 151.5 |

The ingredients were compounded together and samples were prepared and tested as described in Example 6. The molded stabilized sample when tested in the weatherometer failed after an exposure period of about 200 hours while the molded unstabilized control sample failed after an exposure period of about 100 hours. The unstabilized control sample when subjected to a temperature of 175° C. had failed after having been exposed to this temperature for 1 hour while the stabilized sample remained substantially clear and light colored after the same exposure.

Example 8

Another composition embodying this invention is illustrated by the following recipe:

| Material: | Parts by weight |
|---|---|
| Polyvinyl chloride | 100.0 |
| Dioctyl phthalate | 50.0 |
| Equimolar dibutyl tin oxide-diethyl phthalate reaction product | 3.0 |
| Total | 153.0 |

The ingredients were compounded together and samples were prepared and tested as described in Example 6. The molded unstabilized control sample failed after being tested in the weatherometer after about 100 hours of exposure while the molded stabilized sample did not fail until after about 320 hours of exposure. Heat stability tests made on stabilized and unstabilized samples of the composition indicated that the unstabilized sample had failed after being heated at 175° C. for 1 hour while the stabilized sample was clear and light colored after being heated at this temperature for the same period of time.

Example 9

Another typical composition is illustrated by the following recipe:

| Material: | Parts by weight |
|---|---|
| Polyvinyl chloride | 100.0 |
| Dioctyl phthalate | 50.0 |
| 4:1 dibutyl tin oxide-ethyl ortho silicate reaction product | 0.1 |
| Total | 150.1 |

The composition was prepared as described in Example 6 and the compounded composition exhibited properties of stability toward heat and light comparable to those of the stabilized composition described in Example 6.

The incorporation of reaction products within the purview of this invention into polymeric vinyl and vinylidene chloride compositions retards the deterioration of these compositions produced by sunlight and heat which cause the compositions to discolor, crack and harden permitting compositions stabilized with my reaction products to be molded into numerous configurations without an accompanying deterioration of the composition during the molding process and also permits the compositions to be utilized for many purposes for which unstabilized compositions would be unsatisfactory.

It is clear that obvious modifications and variations of this invention may be made without departing from the spirit and scope of the invention as defined in the appended claims.

I claim:

1. A composition of matter comprising the reaction product of an organo-tin oxide having the empirical formula $R_1R_2SnO$ where $R_1$ and $R_2$ represent monovalent hydrocarbon groups, with a hydrocarbon ester of an oxygen-containing acid having at least one oxygen atom in the acid radical attached to a replaceable acid hydrogen atom.

2. A composition of matter comprising the reaction product of an organo-tin oxide having the empirical formula $R_1R_2SnO$ where $R_1$ and $R_2$ represent monovalent alkyl groups, with a hydrocarbon ester of an oxygen-containing acid having at least one oxygen atom in an acid radical attached to a replaceable acid hydrogen atom.

3. A composition of matter comprising the reaction product of an organo-tin oxide having the empirical formula $R_1R_2SnO$ where $R_1$ and $R_2$ represent monovalent aryl groups, with a hydrocarbon ester of an oxygen-containing acid having at least one oxygen atom in an acid radical attached to a replaceable acid hydrogen atom.

4. A composition of matter comprising the reaction product of an organo-tin oxide having the empirical formula $R_1R_2SnO$ where $R_1$ represents a monovalent aryl group and $R_2$ represents a monovalent alkyl group, with a hydrocarbon ester of an oxygen-containing acid having at least one oxygen atom in an acid radical attached to a replaceable acid hydrogen atom.

5. A composition of matter comprising the reaction product of an organo-tin oxide having the empirical formula $R_1R_2SnO$ where $R_1$ and $R_2$ represent monovalent hydrocarbon groups, with a hydrocarbon ester of a carboxylic acid.

6. A composition of matter comprising the reaction product of an organo-tin oxide having the empirical formula $R_1R_2SnO$ where $R_1$ and $R_2$ represent monovalent hydrocarbon groups, with a hydrocarbon ester of an inorganic acid containing at least one oxygen atom in the acid radical attached to a replaceable acid hydrogen atom.

7. A heat and light stabilized composition comprising a polymer of monomeric material including a chloroethylene having from one to two chlorine atoms attached to one only of the carbon atoms and a stabilizer for said polymer comprising the reaction product of an organo-tin oxide having the empirical formula $R_1R_2SnO$ where $R_1$ and $R_2$ represent monovalent hydrocarbon groups, with a hydrocarbon ester of an oxygen-containing acid having at least one oxygen atom in an acid radical attached to a replaceable acid hydrogen atom.

8. A heat and light stabilized composition comprising a polymer of monomeric material including predominantly a chloroethylene having from one to two chlorine atoms attached to one only of the carbon atoms, a plasticizer for said polymer, and a stabilizer for said polymer comprising the reaction product of an organo-tin oxide having the empirical formula $R_1R_2SnO$ where $R_1$ and $R_2$ represent monovalent aryl groups, with a hydrocarbon ester of an oxygen-containing acid having at least one oxygen atom in an acid radical attached to a replaceable acid hydrogen atom.

9. A heat and light stabilized composition comprising a polymer of monomeric material including predominantly a chloroethylene having from one to two chlorine atoms attached to one only of the carbon atoms, a plasticizer for said polymer, and a stabilizer for said polymer comprising the reaction product of an organo-tin oxide having the empirical formula $R_1R_2SnO$ where $R_1$ and $R_2$ represent monovalent alkyl groups, with a hydrocarbon ester of an oxygen-containing acid having at least one oxygen atom in an acid radical attached to a replaceable acid hydrogen atom.

10. A heat and light stabilized composition comprising a polymer of monomeric material including predominantly a chloroethylene having from one to two chlorine atoms attached to one only of the carbon atoms, a plasticizer for said polymer, and a stabilizer for said polymer comprising the reaction product of an organo-tin oxide having the empirical formula $R_1R_2SnO$ where $R_1$ represents a monovalent aryl group and $R_2$ represents a monovalent alkyl group, with a hydrocarbon ester of an oxygen-containing acid having at least one oxygen atom in an acid radical attached to a replaceable acid hydrogen atom.

11. A heat and light stabilized composition comprising a polymer of monomeric material including predominantly a chloroethylene having from one to two chlorine atoms attached to one only of the carbon atoms, a plasticizer for said polymer, and a stabilizer for said polymer comprising the reaction product of an organo-tin oxide having the empirical formula $R_1R_2SnO$ where $R_1$ and $R_2$ represent monovalent hydrocarbon groups, with a hydrocarbon ester of a carboxylic acid.

12. A heat and light stabilized composition comprising a polymer of monomeric material including predominantly a chloroethylene having from one to two chlorine atoms attached to one only of the carbon atoms, a plasticizer for said polymer, and a stabilizer for said polymer comprising the reaction product of an organo-tin oxide having the empirical formula $R_1R_2SnO$ where $R_1$ and $R_2$ represent monovalent hydrocarbon groups, with a hydrocarbon ester of an inorganic acid containing at least one oxygen atom in the acid radical attached to a replaceable acid hydrogen atom.

13. A heat and light stabilized composition comprising a polymer of monomeric material including predominantly vinyl chloride, a plasticizer for said polymer, and from 0.1 to 5 percent by weight based on the weight of said polymer of a stabilizer for said polymer comprising the reaction product of an organo-tin oxide having the empirical formula $R_1R_2SnO$ where $R_1$ and $R_2$ represent monovalent hydrocarbon groups, with a hydrocarbon ester of an oxygen-containing acid having at least one oxygen atom in an acid radical attached to a replaceable acid hydrogen atom.

14. A heat and light stabilized composition comprising a polymer of monomeric material including predominantly vinylidene chloride, a plasticizer for said polymer, and from 0.1 to 5 percent by weight based on the weight of said polymer of a stabilizer for said polymer comprising the reaction product of an organo-tin oxide having the empirical formula $R_1R_2SnO$ where $R_1$ and $R_2$ represent monovalent hydrocarbon groups, with a hydrocarbon ester of an oxygen-containing acid having at least one oxygen atom in an acid radical attached to a replaceable acid hydrogen atom.

15. A heat and light stabilized composition comprising a polymer of monomeric material including predominantly a chloroethylene having from one to two chlorine atoms attached to one only of the carbon atoms and from 0.1 to 5 percent by weight based on the weight of said polymer of a reaction product of an organo-tin oxide having the empirical formula $R_1R_2SnO$ where $R_1$ and $R_2$ represent monovalent hydrocarbon groups, with diethyl maleate.

16. A heat and light stabilized composition comprising a polymer of monomeric material including predominantly a chloroethylene having from one to two chlorine atoms attached to one only of the carbon atoms and from 0.1 to 5 percent by weight based on the weight of said polymer of a reaction product of an organo-tin oxide having the empirical formula $R_1R_2SnO$ where $R_1$ and $R_2$ represent monovalent hydrocarbon groups, with ethyl ortho silicate.

17. The method of making an organo-tin composition of matter which comprises reacting an organo-tin oxide having the empirical formula $R_1R_2SnO$ where $R_1$ and $R_2$ represent monovalent hydrocarbon groups, with a hydrocarbon ester of an oxygen-containing acid having at least one oxygen atom in an acid radical attached to a replaceable acid hydrogen atom.

18. The method of making a heat and light stabilized composition which comprises adding the reaction product of an organo-tin oxide having the empirical formula $R_1R_2SnO$ where $R_1$ and $R_2$ represent monovalent hydrocarbon groups, with a hydrocarbon ester of an oxygen-containing acid having at least one oxygen atom in an acid radical attached to a replaceable acid hydrogen atom to a polymer of monomeric material including predominantly a chloroethylene having from one to two chlorine atoms attached to one only of the carbon atoms.

19. The method of stabilizing a polymer of monomeric material including predominantly a chloroethylene having from one to two chlorine atoms attached to one only of the carbon atoms against the effects of heat and light which comprises adding from 0.1 to 5.0 percent by weight based on the weight of said polymer of the reaction product of an organo-tin oxide having the empirical formula $R_1R_2SnO$ where $R_1$ and $R_2$ represent monovalent hydrocarbon groups, with a hydrocarbon ester of an oxygen-containing acid having at least one oxygen atom in an acid radical attached to a replaceable acid hydrogen atom to said polymer.

20. The method of making a heat and light stabilized composition containing a polymer of monomeric material including predominantly a chloroethylene having from one to two chlorine atoms attached to one only of the carbon atoms which comprises adding a plasticizer for said polymer uniformly throughout said polymer and adding from 0.1 to 5.0 percent by weight based on the weight of said polymer of the reaction product of an organo-tin oxide having the empirical formula $R_1R_2SnO$ where $R_1$ and $R_2$ represent monovalent hydrocarbon groups, with a hydrocarbon ester of an oxygen-containing acid having at least one oxygen atom in an acid radical attached to a replaceable acid hydrogen atom to said polymer.

21. A composition of matter comprising the reaction product of an organo-tin oxide having the empirical formula $R_1R_2SnO$ where $R_1$ and $R_2$ represent monovalent hydrocarbon groups, with a hydrocarbon ester of maleic acid.

RICHARD T. CARROLL.

No references cited.